April 13, 1926.

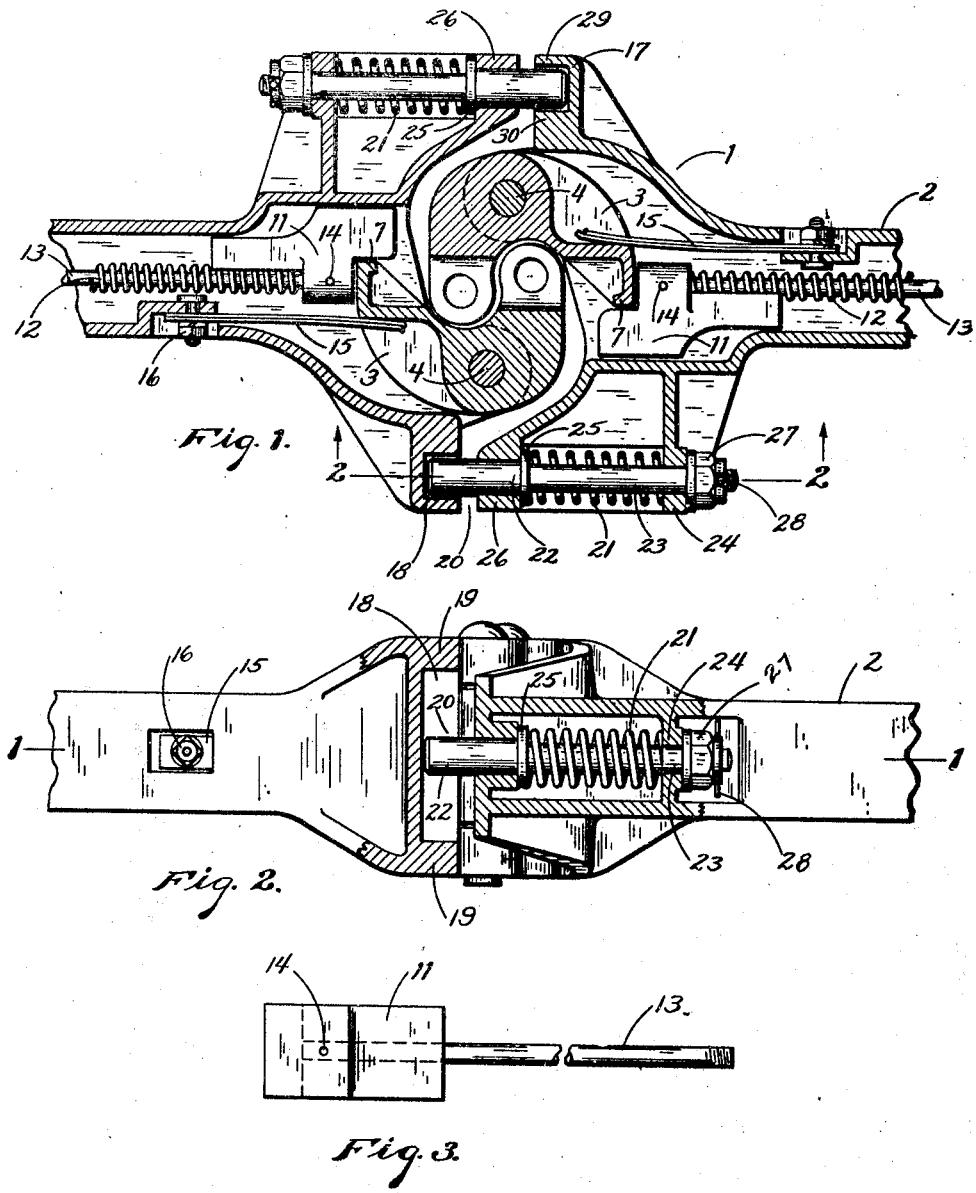

C. H. TOMLINSON

COUPLING MECHANISM

Filed April 25, 1924    2 Sheets-Sheet 2

1,580,869

Witness:
G. G. Allenbaugh

Inventor
CHARLES H. TOMLINSON.
By
Garwood
Attorney

Patented Apr. 13, 1926.

1,580,869

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

COUPLING MECHANISM.

Application filed April 25, 1924. Serial No. 708,894.

*To all whom it may concern:*

Be it known that I, CHARLES H. TOMLINSON, a citizen of the United States of America, residing at Mansfield, in the county of Richland and State of Ohio, have invented certain new and useful Improvements in a Coupling Mechanism, of which the following is a specification.

My invention relates to improvements in car couplers and especially couplers of the Janney type.

In the ordinary type of Janney coupler there is no means provided to prevent the couplers buckling upon impact in "coupling up." While this is not a serious matter on steam road operation where the couplers are practically rigid as against lateral movement, still in electric traction operation where the track curves are short, it is necessary to pivot the couplers so that they will swing laterally a considerable distance. Consequently, when two heads are brought together upon impact, if they are not in exact alinement, and if the couplers are of the ordinary Janney type, they are liable to buckle sideways and no coupling will take place.

One object of my invention is to provide a coupler which will couple even though the couplers are considerably out of alinement.

Another object of my invention is to prevent buckling of the coupled heads when one car is pushing the other.

Another object of my invention is to limit the vertical movement of the heads relative to each other so as to prevent their uncoupling through excessive vertical movement.

I attain these objects and other objects through the new and novel construction, combination and relation of the various parts hereinafter fully described and disclosed in the drawings.

In the drawings:

Fig. 1 is a top sectional view of two couplers in coupled relation embodying my invention.

Fig. 2 is a side view of my invention in partial section on the line 2—2 of Fig. 1.

Fig. 3 is a locking device which I employ to lock the coupling knuckle when two heads are in coupled relation.

Figure 4:
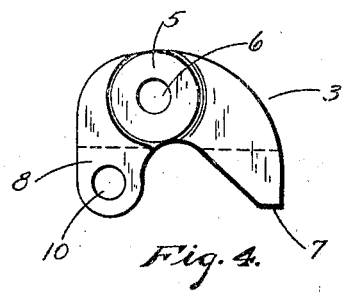
Figs. 4, 5 and 6 are various views of the coupler knuckle.
Figure 5:
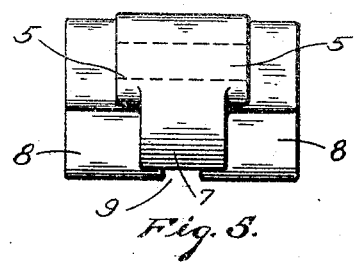
Figure 6:
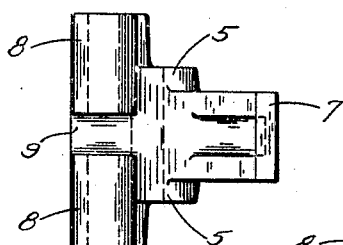
Figure 7:
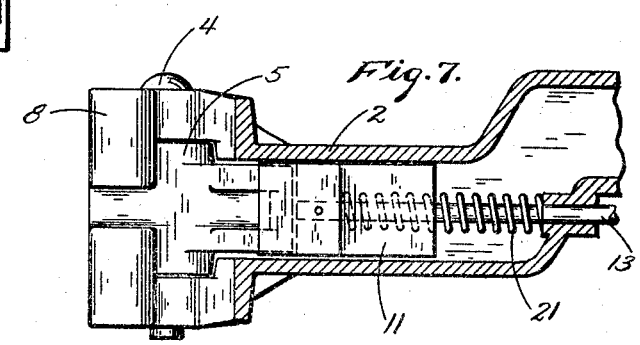
Fig. 7 is a view in partial section through the coupler tail piece to show the locking arrangement shown in Fig. 3.

In the preferred embodiment of my invention I employ a coupler head 1 provided with a tail piece 2 integrally secured together and by means of which the coupler head is secured to the draft gear as is well known in the art.

The coupler head 1 is hollow and mounted therein is a knuckle 3 adapted to co-act with the knuckle on a co-operating coupler. The knuckle is pivotally mounted within the head 1 by means of the pin 4. The knuckle 3 is provided with the boss 5 which has a passage 6 therethrough to receive the pin 4. The knuckle is also provided with a locking tongue 7 to engage a sliding lock, later described, to hold the knuckle in locked position. The knuckle is also provided with the inter-coupling end 8 provided with the slot 9 positioned therein and the passage 10. The elements 9 and 10 are for use in coupling to a foreign coupler by inserting a bar provided with a passage therethrough in the slot 9 and inserting a pin through the said passage and the passage 10. The coupling bar referred to is not shown as it is not a part of my invention, but its application will be readily understood. Mounted within the coupler head 1 is a sliding lock 11 adapted to reciprocate in a forward and backward longitudinal direction and spring held in a forward direction by means of the spring 12 positioned about the rod 13 which in turn is secured to the lock 11 either by threading or by the pin 14. The rear end of the rod 13 is shown as threaded in order to attach it to a mechanism by means of which the lock may be moved rearwardly, as for instance, by the mechanism shown in my Patent No. 941,965, dated November 30, 1909, or by other mechanisms performing the same function.

It will be evident that with the parts shown, as in Fig. 1, that the locking tongue 7 is in engagement with the lock 11 therefore, any pull on either coupler head will only tend to bring the locking tongue 7 more strongly against the lock 11. If, however, the sliding lock 11 in either head should be retracted against the action of the spring 12, the knuckle in that head would be permitted to swing or pivot about the pin 4 to its uncoupling position and the heads could be separated if both sliding locks are retracted.

When two heads are separated by retracting the locks 11 and drawing the heads apart the knuckles will swing outwardly and when the lock 11 is released it will move forward, but the locking tongue 7 will then rest in front of the lock 11, but upon bringing the heads together again, pressure will be brought upon the knuckles through impact and the locking tongue 7 will automatically move the lock 11 rearwardly and permit the locking tongue 7 and lock 11 to assume again the relation shown in Fig. 1. In order to automatically move the knuckle to an open position when the lock 11 is retracted on a single head, I employ the spring 15 secured to the body by means of the bolt and nut 16 and pressing against the knuckle as shown in Fig. 1.

Projecting laterally from one side of the head 1 is an arm 17 provided with a vertically disposed slot 18 and having its upper and lower ends closed by the members 19.

Projecting longitudinally from the opposite side of the head is a reciprocating spring held pin 20. This pin is held normally in a forward position by means of the spring 21 pressing against the large portion 22 of the pin integrally formed with the reduced portion 23 and also pressing against the abutment 24. Interposed between the portion 22 of the pin and spring 21 is an enlarged washer 25 which engages the abutment 26 on the coupler head when the pin is in the forward position. To maintain the pin 20 in assembled relation with the head I secure thereto at the rear end a nut 27 held in position by the through cotter 28.

The coupler heads are made in duplicate and when installed upon the cars and brought into engagement their relation will be reversed, in that the pins 20 on the heads will cooperate with the corresponding slot 18 on the cooperating head. It will be readily seen that the pin 20, positioned within the slot 18, is limited in its vertical movement within the slot by the walls 19 and this will limit the relative vertical movement of the heads 1 when coupled and therefore prevent the uncoupling of the heads when the vertical movement is greater than the vertical height of the coupling portion 8 of the knuckles. It will also be observed that the lateral relative movement of two coupled heads will be limited by the side walls 29 and 30 forming the slot 18. By having the pins 20 spring held, the tendency will be to maintain the two heads in condition in which lost motion is practically limited and it will also facilitate the coupling of two heads when they come together on an angle, in that since the diameter of the portion 22 of the pin 20 is made substantially equal or slightly less than that of the width of the slot 18, the bringing together of the heads on an angle would not permit the pin to properly enter the slot 18. This, of course, depending upon the relative sizes of the pin and slot and the angle at which the heads are brought together, but by having the pins yielding, when the heads are brought together, the pin will yield when it engages the opposite coupler and permit the arm 17 to engage with the arm 26 and this will tend to force the couplers into an alined condition in which their longitudinal axes will substantially coincide or be parallel and as the coupler heads swing into alinement the pin 20 will finally engage within the slot 18 The angular displacement of the longitudinal axes of two coupler heads is dependent largely upon the clearance between the parts 17 and 26 on two co-operating heads. The members 20 act as buffers or shock-absorbers when the heads are brought together on impact.

Figure 8:
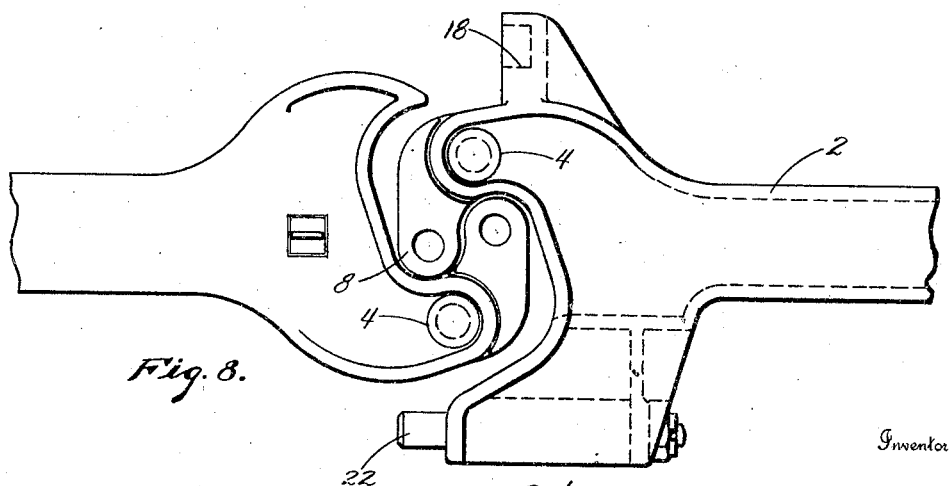
Fig. 8 is a top plan view of my improved coupler head as coupled to an ordinary type of Janney coupler, and also shows the freedom of movement of one head relative to the other in a lateral direction and which freedom of movement would also be attained if two ordinary coupler heads were coupled together.

In Fig. 8 is shown one of my improved coupler heads intercoupled with a common Janney type of coupler. From this it will be seen that it is possible to intercouple the two heads, but it will also be seen that there is nothing to prevent the buckling of the heads if the couplers are in compression. In the drawing they are shown at a tension relation. The advantage of my improved construction with its guard arms over the standard Janney coupler is believed to be apparent when comparing Fig. 8 with Fig. 1.

It will be apparent to those skilled in the art that modifications may be made from the construction herein shown, but which will still have embodied therein my invention.

I claim:

1. In combination, a pair of complementary car coupler heads, interlocking means to hold the heads in coupled relation against longitudinal separation and yielding reciprocating means on one head to cooperate with means on the other head to limit the vertical movement of the heads relative to each other.

2. In combination, a pair of complementary car coupler heads, each head having a draw bar secured thereto, cooperating means on each head to limit the lateral angular movement of the heads relative to each other in either direction and cooperating means on each head to limit the relative lateral movement of the heads in either direction and to limit the vertical movement of the heads relative to each other, the said means comprising a pin on each head cooperating with a slot on the opposite head.

3. In combination, a pair of complementary car coupler heads, each head having a draw bar secured thereto to secure the head to a car body, cooperating means on each head to limit the lateral movement of the heads relative to each other in either direction and to limit the vertical movement of the heads relative to each other, the said means comprising a yielding pin on each head cooperating with a slot on the opposite head.

4. In combination, a pair of complementary car couplers, each provided with a draw bar for mounting the coupler on a car, reciprocating means on one coupler cooperating with means on the other coupler to permit a limited vertical relative movement of the couplers and prevent lateral relative movement in either direction.

5. In combination, a pair of complementary car coupler heads, each head having a draw bar secured thereto to secure the head to a car body, cooperating means on each head to limit the lateral angular movement of the heads relative to each other and yielding means on each head comprising a reciprocating pin on each head cooperating with a slot having side and end walls on the opposite head to permit a limited vertical movement of the heads relative to each other and no relative lateral movement in either direction.

6. In combination, a pair of complementary car coupler heads, each head provided with means to secure it to a car, yielding means on one head cooperating with means on the other head tending to move the heads apart longitudinally and limit the vertical movement of the heads relative to each other and cooperating means on the heads to maintain the heads against separation.

7. In combination, a pair of coupler heads each provided with means to secure the head to a car, a coupling member on one head secured thereto to cooperate with a coupling member on the other head, means on each head to cooperate with the coupling member on that car to maintain the coupling member in coupling relation with the coupling member on the other car when the heads are in coupled relation and yielding means on each head to engage with means on the other head to limit the relative vertical movement of the heads and prevent relative lateral movement in either direction.

8. In combination, a pair of coupler heads each provided with means to secure the heads to a car, cooperating coupling means on each head to maintain the heads in coupled relation, locking means to maintain the coupling means in coupled or uncoupled relation at will, means to prevent buckling of the heads upon impact or thrust and yielding means on each head to engage with means on the other head to limit the vertical relative movement of the heads and prevent relative lateral movement in either direction.

9. In a car coupler mechanism, the combination of a head member, a coupling member, means to secure the head to a car and spring held reciprocating means projecting from the head to engage a counterpart head on impact to cushion the impact blow, prevent relative lateral movement in either direction and limit the vertical movement.

In testimony whereof I affix my signature.

CHARLES H. TOMLINSON.